May 7, 1963  D. H. HAWES ETAL  3,089,021
METHOD FOR FORMING A COMPOSITE WELDED ARTICLE
Filed June 1, 1960  5 Sheets-Sheet 1
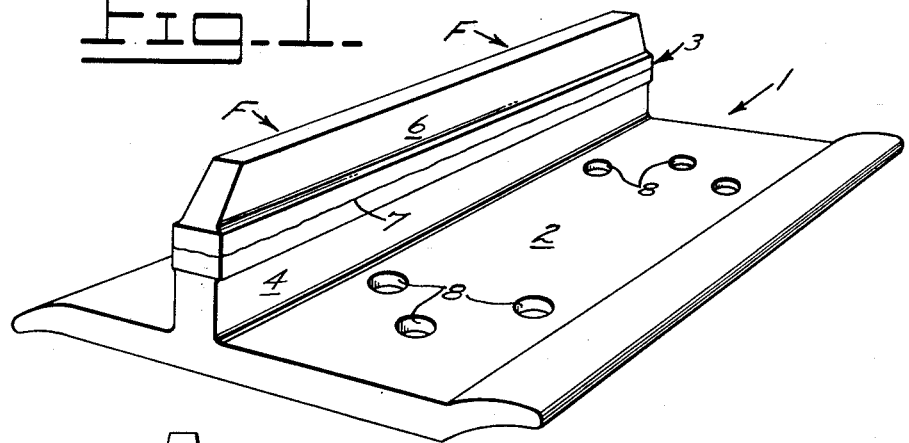
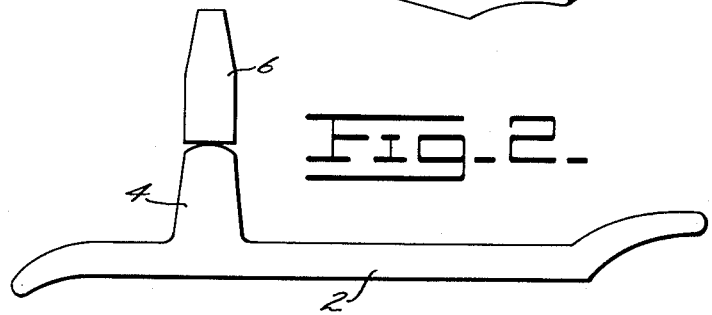
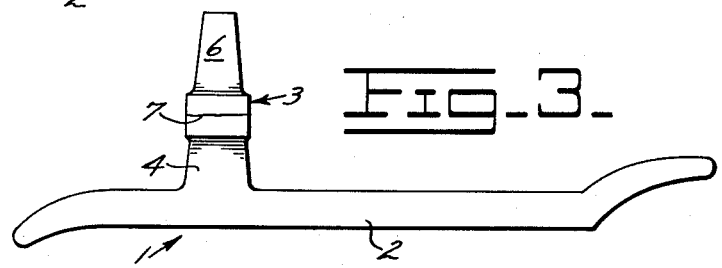
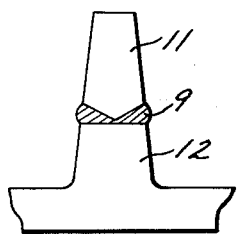
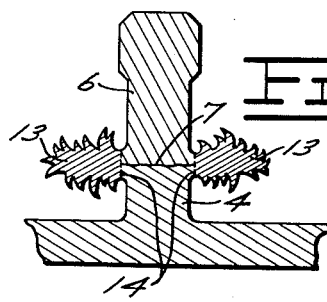
INVENTORS
DAVID H. HAWES
T H SPENCER
BY
ATTORNEYS

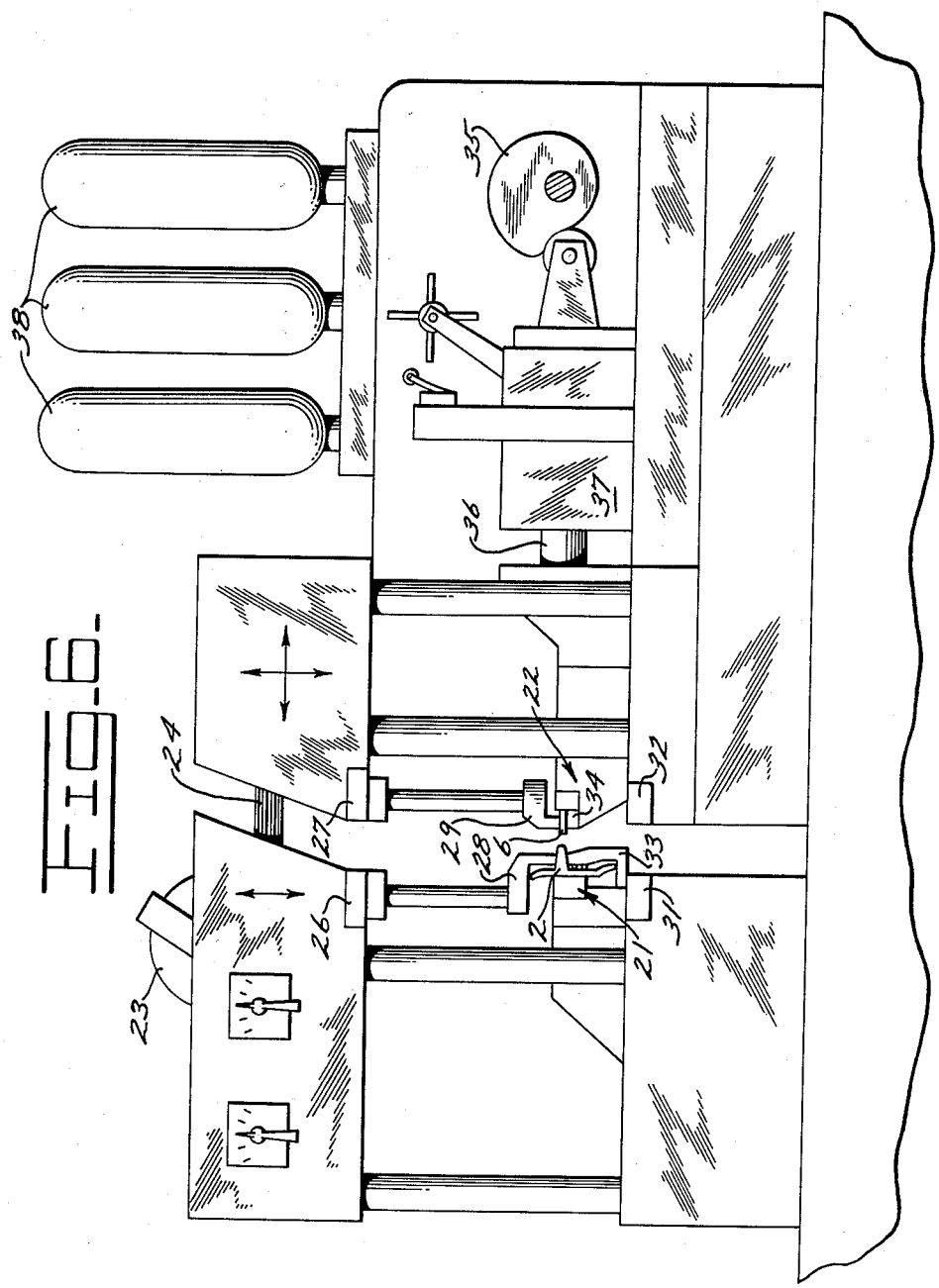

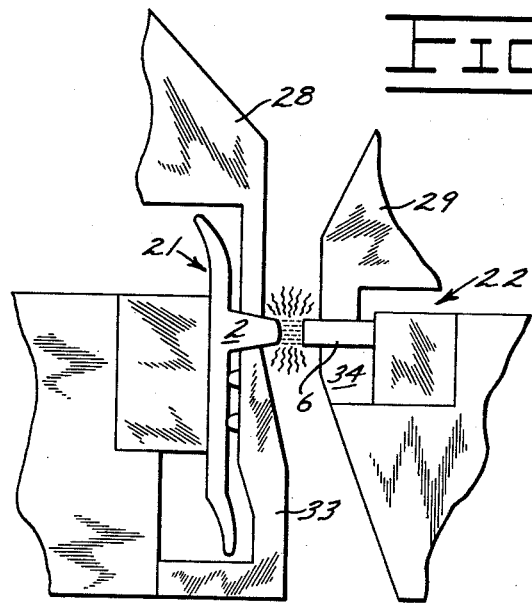
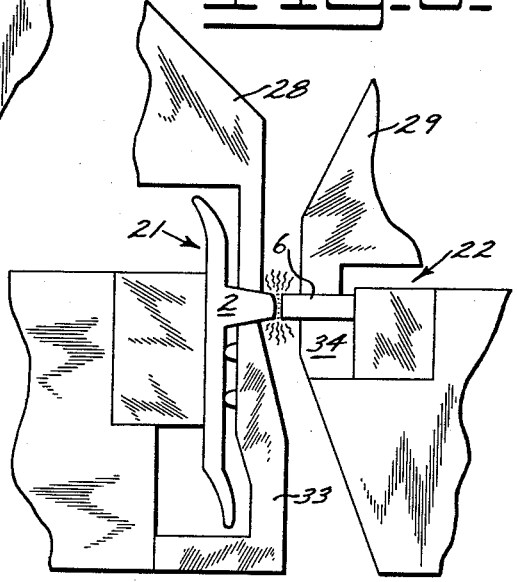
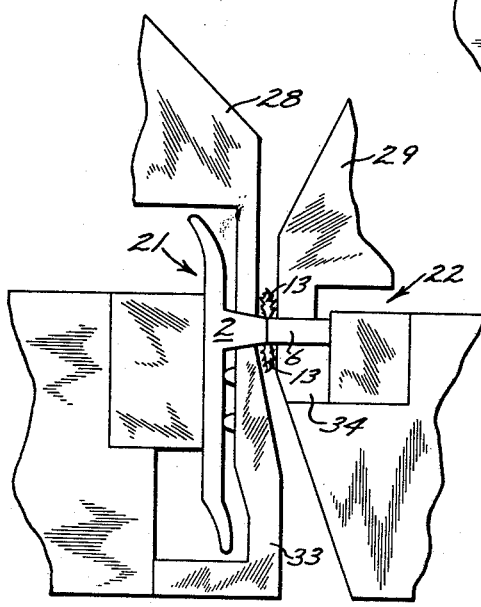

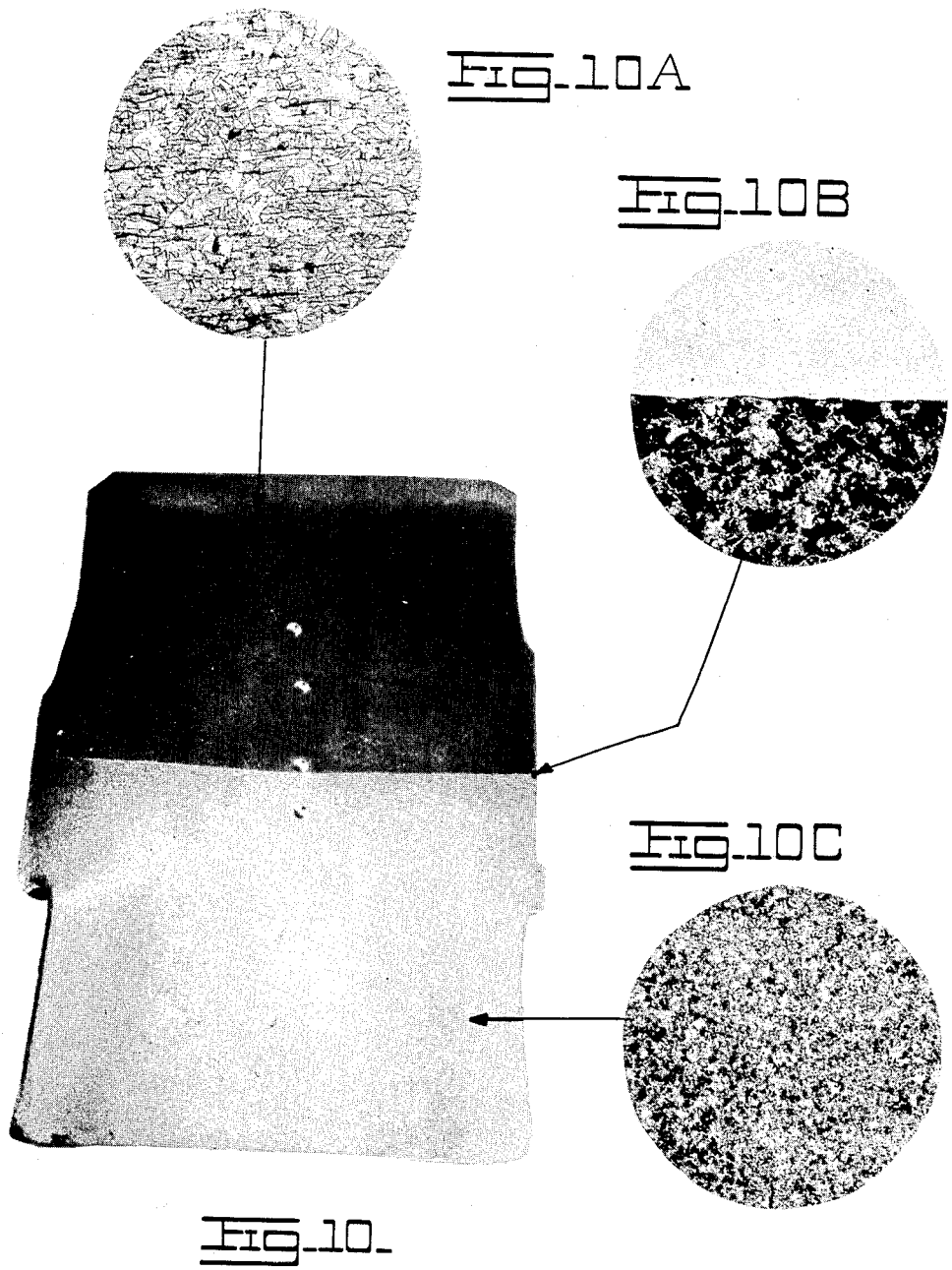

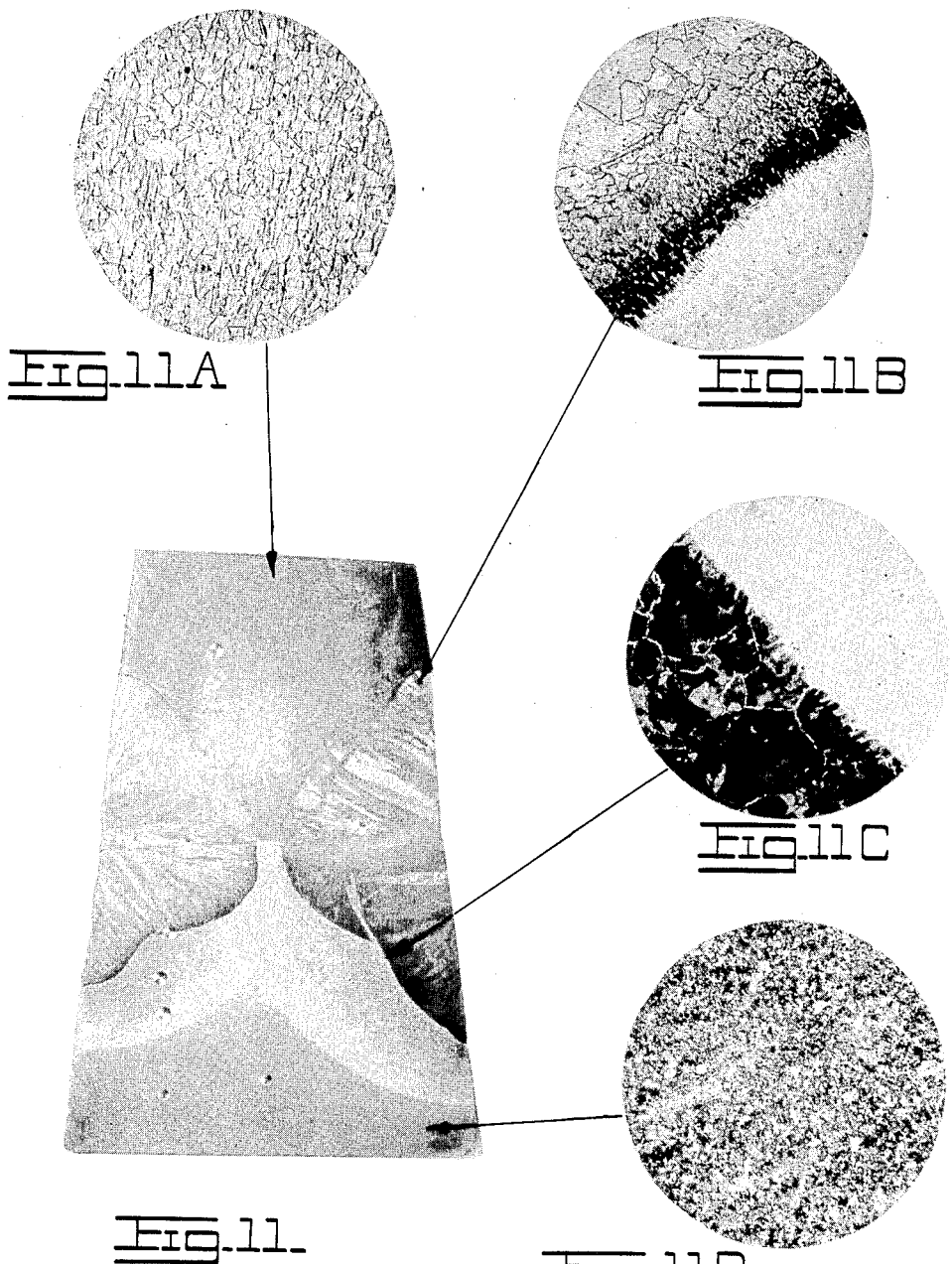

United States Patent Office 3,089,021
Patented May 7, 1963

3,089,021
METHOD FOR FORMING A COMPOSITE WELDED ARTICLE
David H. Hawes, Pekin, and T H Spencer, Peoria, Ill., assignors to Caterpillar Tractor Co., Peoria, Ill., a corporation of California
Filed June 1, 1960, Ser. No. 33,229
4 Claims. (Cl. 219—104)

This invention relates to a method for forming a composite welded article. More particularly, the invention relates to the method of welding together two sections of ferrous materials of different and distinct compositions along a well defined weld plane or interface in a solid state bond which is characterized by a lack of interdiffusion and admixture between the compositions of the respective sections which make up the welded article.

While hereinafter the invention will be described in connection with a grouser type track shoe for the track of a crawler type vehicle, it should be understood that the invention may equally well to employed in connection with various other articles in which a composite structure will prove advantageous, such as ripper or scarifier teeth for construction vehicles, bucket and scraper teeth for digging and earth moving machines, and the like. While the track shoe thus formed pursuant to the method of this invention may be employed on all types of track type vehicles, it has particular utility with crawler type tractors commonly employed in earth moving operations.

Because tractor sizes and weights are progressively increasing in order that tractors may accommodate greater loads, the track pitch of the tractors must be increased accordingly. With tractors having larger track pitch dimensions, a larger track shoe naturally is required and with such an increased size shoe a larger grouser also becomes necessary.

Conventional manufacturing procedures for producing track shoes with integral grousers generally involve rolling operations in which the grouser material is displaced from the ingot being rolled to provide the track shoe base plate with its attached grouser projecting therefrom. In a rolling operation, the height of the grouser is limited due to the amount of metal displacement possible with available materials. Furthermore, because a pronounced draft angle on the rolls is required, the resulting grouser must be tapered in a direction from the base plate of the track shoe to the grouser tip. This results in a grouser which is relatively heavy at its point of juncture with the base plate and which is relatively thin at the tip, which latter location is generally the one which requires adequate material to impart strength and wearability to the track shoe.

An alternative production method involves casting track shoes but, except for special situations, this method is not preferred because of its cost.

Production track shoes heretofore generally were produced in their entirety from the same material with the grouser tip section being no stronger, tougher nor more wear resistant than the base plate of the shoe. Because it quite frequently is desirable to tailor a particular shoe to meet a particular need depending upon the job in which the tractor on which the shoe is located is to be employed, it is highly desirable that a specific material may be chosen for the grouser tip section which will withstand wear without adversely affecting the remainder of the track shoe and without increasing disproportionately the unit cost.

Accordingly, the present invention relates to a method for forming a tractor track shoe or similar article which is composite in construction and which has a specially selected grouser tip section welded to the base plate of the track shoe in a manner which imparts increased wear resistance to the grouser tip and which provides a grouser of any desired cross-sectional configuration.

The composite wear resistant construction disclosed herein is preferred over prior art track shoes produced entirely from a wear resistant material in that the base plate of the track shoe desirably must be ductile and easily machineable so that drilling or like operations may be performed thereon during the formation of bolt holes therein. In addition, by providing a separate grouser tip section and welding the same to a machineable base plate, the tip section may be imparted with any configuration desired so that optimum wear and failure resistant qualities are imparted to the tip section without affecting the characteristics of the remainder of the track shoe. Also, track shoe unit cost may be minimized.

While it has been known in the art heretofore to cast or otherwise form track shoes in their entirety from a wear resistant material, as noted previously such materials generally are difficult to machine so that the base plate section of such a shoe cannot properly be formed. In addition, the expense entailed in forming such a shoe entirely from a wear resistant material is great and is unnecessary in view of the fact that the track shoe wear is generally confined to the grouser thereof.

In addition, it also has been known heretofore to fusion weld a wear resistant grouser to worn track shoe plates as temporary repair measures in the field in attempts to salvage still usable track shoe plates which have worn out grousers but which otherwise are substantially undamaged. However, such fusion welding, as will be described hereinafter, generally produces stress concentrations in the welded article which results in cracking under use. Accordingly, fushion welding has not proved satisfactory.

This invention relates to a method of electrical resistance pressure welding a highly wear resistant alloy steel to a track shoe base plate formed from machineable plain carbon steel so that a composite track shoe having in the grouser area the highly desirable features of toughness and wear resistance and in the base plate area the desirable features of ductility and ease of machineability is provided. Such an article and the welding method involved is illustrated in the accompanying drawings in which:

FIG. 1 is an isometric view of a track shoe formed by the method of the present invention.

FIG. 2 is an end elevational view of a track shoe prior to welding the grouser tip section to the base plate.

FIG. 3 is an end elevational view of a completed welded article.

FIG. 4 is a partial end elevation of a temporarily repaired fusion welded track shoe grouser.

FIG. 5 is a sectional view taken through a welded track shoe illustrating the flash material expelled from between the welded grouser tip and base sections during the welding operation. This figure illustrates a modified grouser tip configuration.

FIG. 6 is a side elevational view of an automatic welding machine which may be employed in carrying out the subject welding operation.

FIGS. 7 through 9 illustrate in sequence the welding operation.

FIGS. 10 through 10C are photomicrographs which illustrate details of a composite track shoe welded according to this invention.

FIGS. 11 through 11D are photomicrographs illustrating details of a fusion welded track shoe.

Referring to FIGS. 1 and 3 of the drawings, a track shoe 1 is shown which comprises a track shoe base plate 2 which has extending transversely thereof and projecting therefrom a composite grouser 3 defined by a base section 4 and a tip section 6. As shown, the grouser base section 4 and tip section 6 are bonded together along a well defined weld plane or interface 7 as will be described hereinafter. In this track shoe, the grouser tip section 6 is of upwardly and inwardly tapered configuration but it should be understood that, because the grouser tip section is formed from a separate and discrete grouser bar, various and varied configurations and cross-sections may be imparted thereto depending upon a predetermined need. In this manner, the grouser may be provided with extra material selectively located in the areas of most stress and wear.

As shown in FIG. 2, prior to welding the track shoe comprises two discrete parts, namely a separate grouser bar which makes up the tip section 6 and the track shoe base plate 2 which has the grouser base section 4 integrally preformed therewith. By comparing FIGS. 2 and 3 it will be noted that the overall height of the grouser sections prior to welding is greater than the overall height thereof after welding because a predetermined amount of molten material is forced from between the grouser sections during the welding operation as will be described.

Desirably base plate 2 is provided with a plurality of holes 8 drilled or otherwise provided therein. Such holes are required for receiving bolt type fasteners therethrough so that the track shoe may be operatively connected with other similar track shoes in a completed crawler vehicle track.

Because of the necessity for providing such holes 8 in the base plate 2 of the track shoe, as well as the requirement that other machining operations which are well known may be performed on such base plate, desirably the same is formed from a strong yet machineable ferrous material, such as a suitable plain carbon steel. The tip section of the grouser, however, which is the portion of the shoe plate most subjected to shock and wear, desirably is formed from a ferrous material having a composition different from that of the shoe plate. Desirably such grouser tip section 6 is preformed from a tough wear and stress resistant alloy steel. The particular material chosen for the grouser tip section may be governed by the terrain and working conditions in which the particular vehicle is to be employed. For example, a vehicle intended for use in rock quarrying operations desirably will use track shoes having different wear and toughness characteristics than the shoes of vehicles to be employed in a sandy or earthy terrain.

As mentioned previously, fusion welding of separate wear resistant grouser tips to a worn grouser base has been employed as a temporary "field fix" repair measure theretofore. However, such fusion welding embodies a conventional arc welding process which requires a filler material 9 between the repair grouser tip 11 and the worn grouser base 12 as shown in FIG. 4. If no such filler is employed drastic cracking in the fusion zone results. Such a fusion welding procedure provides only temporary repair measures at best and has proved to be entirely unsatisfactory in that, even if a compatible filler material is employed, high stress concentrations are built up as a result of the high temperatures imparted to the repair tip and base section of the grouser during the melting and resolidification which occur during a fusion welding operation.

As shown in FIG. 5, the subject welding procedure does not entail the use of any filler material as is true in conventional fusion welding operations so that the grouser tip 6 is welded to the grouser base 4 along a well defined weld plane or interface 7 which will be defined in detail hereinafter. Briefly, however, the tip 6 and base 4 of the grouser are subjected to rapid and brief heating so that adjacent portions of the tip and base as viewed in FIG. 2 are softened and rendered molten in a predetermined, controlled manner. Thereafter, the tip and base sections of the grouser are urged together under great pressure so that the molten material is expelled as flashing 13 from opposite sides and ends of the track shoe grouser. The pressure employed is sufficiently great to weld securely together in a solid state bond the plastic grouser tip and base sections in a manner such that the weld interface between such sections is generally free of interdiffusion and admixture between the two different materials of the respective sections. In FIG. 5 the relative sections of the grouser are differently cross-hatched to indicate their different compositions. In addition, the cross-hatching of the flashing 13 expelled from between the grouser sections is still differently cross-hatched to illustrate that the expelled molten material comprises a combination or mixture of the materials of the two grouser sections. The vertical dotted lines 14 are intended to illustrate the line of demarcation at which the diffused flashing material is separated from the undiffused material of the respective grouser base section and tip section. It should be noted that the grouser tip of FIG. 5 is one of many modified constructions which may be employed which depart from the more conventional tapered grouser shown in FIGS. 1–4.

Reference is now directed to FIG. 6 which illustrates a welding machine found suitable for carrying out the subject welding procedure. This machine is of a known type and does not form part of this invention but is shown herein for illustrative purposes only. The track shoe parts to be welded are clamped in the machine by a pair of electrical current carrying platen dies. Die 21 in which the track shoe plate 2 is mounted is stationary while the other die 22 in which the grouser bar 6 is mounted is movable relative to die 21. Desirably, the clamping jaws of the dies are water cooled or the like so that the major portions of the pieces being welded are maintainable at a heat level which will not adversely affect the resulting welded structure.

Power for welding is supplied by two 1500 kva. water cooled transformers, one of which is visible at 23 above the top of the machine and the other of which is below the machine and out of sight. Individual transformers or both transformers in parallel may be used as a source of power.

Since the dies are relatively movable, the transformer output connections must permit movement and for this purpose a flexible lead 24 extends between the mounting structure of the respective dies. Opposite electrical contacts 26 and 27 are provided in which the upper clamping jaws 28 and 29 of the respective dies are engaged. Lower electrical contacts 31 and 32 are operatively engaged with the lower clamping jaws 33 and 34 of the respective dies.

Movement of movable die 22 is effected by means of a rotatable cam 35 which is actuated and automatically controlled in any suitable manner. Movement of the cam 35 will effect relative movement of the grouser sections in the relatively movable jaws towards each other to a location at which an arc may be struck between the grouser sections. Cam 35 also will compensate automatically for closing of the gap between the grouser sections as the material of the respective sections becomes molten and burns off.

After the arc has been maintained for a sufficient period of time welding pressure may be applied by means of a hydraulic piston 36 actuated by a hydraulic cylinder 37 which obtains its pressure from hydraulic fluid maintained under pressure in a bank of pressure accumulators 38. Extension of piston 37 will effect further movement of die 22 toward die 21 to force the heated grouser sections into contact with each other to effect the welding operation.

Reference to FIGS. 7 through 9 will illustrate the sequence of events in the welding procedure with FIG. 7 showing the arc being initially struck between the base plate 2 of the track shoe and the grouser tip section 6 to be welded thereto. In FIG. 8 the gap between the sections is closed as heating progresses and in FIG. 9, after the electrical current and arc have been cut off, the movable die 22 is urged still further towards fixed die 21 to bring the grouser sections into intimate contact and to effect welding upon the molten material being expelled from therebetween in the form of flashing 13.

If desired, the welding operation may be carried out in a neutral atmosphere to preclude undesirable oxidation or the like at the weld joint which might result in slag, voids, or inclusions which are known to be stress raisers. For this purpose the machine dies may be surrounded by a neutral gas such as argon or nitrogen. However, the use of such a neutral atmosphere is not essential because any slag or inclusions which would tend to form at the weld generally will be expelled with the molten metal or will be driven off by the electrical arc.

Prior to the subject invention it has been known that ferrous materials such as plain carbon steels having the same or substantially similar compositions could be flash resistance welding together. However, heretofore the flash resistance pressure welding of specialty alloy steels to plain carbon steel bases has been generally unsuccessful.

A specialty steel such a austenitic manganese steel is well suited for use as a grouser tip because of its toughness and wear resistance. However, heretofore attempts to weld an austenitic manganese steel to a base of a non-alloy plain carbon steel have been unsuccessful. Because of the substantially different physical properties and characteristics between these two materials suitable welding thereof has been generally accepted as being impractical and unsuitable. Heretofore, the only method considered at all feasible for welding such metals together involved conventional fusion welding which results in high stress concentrations being built up in the welded article which result in cracking and breaking when the welded article is subjected to use.

With the present invention, however, it has been found that composite articles such as track shoes defined by an austenitic manganese grouser tip and a plain carbon track shoe base plate can be intimately united to form a strong, stress free weld joint of great strength. That is, referring to FIG. 1, tests have shown that a track shoe welded as disclosed herein which has been subjected to forces directed in a generally normal direction against the grouser tip section 6 in the direction of the arrows F will not be damaged at the weld interface 7. Destructive testing has shown that breakage will occur in the base plate along a line extending transversely of the base plate between a pair of opposite bolt holes 8 provided therein. Such destructive testing points up the great strength of the bond between two dissimilar materials from which the composite grouser is formed which heretofore were generally accepted as being incompatible.

Generally a plain carbon machineable steel designated as a modified SAE 1037 is well adapted for forming track shoe base plates. Such material comprises: carbon 0.32–0.40%; manganese 1.30–1.65%; phosphorous 0.040% maximum; sulphur 0.050% maximum; and silicon 0.15–0.30%.

The wear resistant austenitic manganese steel selected for the grouser tip is of the type known commercially as Hadfield or Mangalloy which has the following composition: carbon, up to 1.4%; manganese 10–14%; silicon 0.2–2.0%; nickel 3.1–3.6%. Desirably, the phosphorous and sulfur content are held below 0.10% and 0.06%, respectively. If desired, the nickel content may be raised to as high as 4% and about 3% chromium and 3% molybdenum may also be added to minimize carbide precipitation as is a well known alloying precedure.

To weld a grouser bar of austenitic manganese steel to a plain carbon base plate, desirably both the grouser bar and base plate are pre-heat-treated so that the desirable grain structure is imparted thereto prior to welding. That is, the shoe section desirably is imparted with a strong martensitic type structure by a well known procedure while the grouser bar is provided with a fully austenitic structure. Such heat treating is generally required before welding because of the diverse physical properties of the two metals which makes heat treating of the composite article after welding impractical.

The base plate may be initially rolled, forged or cast into its desirable configuration while the grouser bar desirably is rolled or cast. Both the shoe plate and grouser bars preferably are formed in elongated lengths which are flame cut, sheared, sawed or otherwise cut to the desired track shoe size prior to the above mentioned heat treating. Following heat treating the respective parts may be cleaned by shot blasting, sand blasting, brushing or the like preparatory to welding.

The actual welding operation may be carried out by employing the following sequence: the base plate and grouser bar are clamped in the welding machine jaws and the adjacent portions of the grouser base section and the grouser tip section are spaced apart and maintained out of contact at a predetermined distance to establish an electrical arc therebetween. As melting of the respective sections occurs, the proper spacing between the two sections to sustain the arc is maintained by moving the jaws relative to each other. After the arc has been maintained for a predetermined brief period of time during which adjacent first portions of the sections are softened and melted and second portions are plasticized, the sections are forced into contact with each other under substantial pressure to cause the molten material to be forced from between the sections to cause the flashing and to produce the intimate bond between the heated plastic material of the second portions. Thereafter the welded track shoe is unclamped from the jaws and the flashing is removed in any suitable manner, such as by hot shearing, grinding or abrasive cutting. Desirably, as shown in FIG. 3, an enlarged ridge of material is retained at the weld zone to further strengthen the joint. Finally, the weld joint is inspected for soundness by employing die penetrants, X-ray testing, or ultrasonics.

For electrical pressure welding austenitic manganese steel to a plain carbon base plate, the following limits may be employed: arcing time, 10–60 seconds; power input voltage, 5–8 volts; amperage, 5,000–20,000 amps. per square inch; forging pressure, 25,000 pounds per square inch to 80,000 pounds per square inch.

As a specific example, the following procedure has been found suitable for welding an austenitic manganese steel grouser bar to a 27 inch track shoe base: arcing time, 15 seconds; voltage, 6.2 volts; amperage, 12,000 amps. per square inch; forging pressure, 40,000 pounds per square inch (approximately 1,200,000 pounds total load). With this control sequence, it has been found that approximately one-half inch of each of the grouser base section and grouser tip section is expelled from the weld joint as molten metal. The remainder of the respective sections, because of the relatively short period of arcing time employed, remains substantially unaffected by the arcing heat and adverse characteristics as a result are precluded from being imparted to the resulting welded composite grouser.

The resulting weld joint between the austenitic manganese steel grouser tip and the plain carbon steel base plate is a solid state bond which is characterized by the absence of interdiffusion and admixture of the two steels employed for the respective grouser sections. Also, due to the upsetting action during the forging operation, there is only a relatively narow heat affected zone adjacent the weld plane or interface and, because the jaws of the welding machine may be water cooled or otherwise maintained at a relatively low temperature, adverse heat effects are precluded. Because austenitic manganese steel becomes brittle (when heated to elevated temperatures and allowed to slow-cool) due to carbide precipitation at the grain boundaries, it is important that all molten manganese steel is expelled from the joint and that the weld bond is made with plastic material which has not become molten or super heated.

FIG. 10 is a photomicrograph (3×) of a cross-section through a welded track shoe grouser which illustrates the well defined weld interface which exists as a result of the subject welding procedure. It will be noted that there is no noticeable heat affected zone in the austenitic manganese material (top of the photomicrograph) and only a relatively narrow heat affected zone in the plain carbon base material. The circular outlines appearing in FIG. 10 are impressions formed by hardness testing apparatus made after the welding operation. FIG. 10A is a photomicrograph (100×) of the unaffected austenitic manganese grouser section which illustrates the typical water toughened grain structure of this steel which is a single phase solid solution structure of equiaxed grains showing annealing twins. The striated appearance is a result of rolling. A few non-metallic inclusions also are evident. FIG. 10C is a photomicrograph (100×) which illustrates a typical structure of the heat treated plain carbon steel base plate and grouser base material which comprises primarily a tempered martensitic structure with a small amount of included ferrite.

FIG. 10B is a photomicrograph (100×) which shows the interface between the austenitic grouser tip (top) and the plain carbon grouser base (bottom). Because of a different etching procedure employed, the upper half of FIG. 10B appears lighter than in the cross-section shown in FIG. 10 and the grain structure thereof is not evident. The lower half of FIG. 10B illustrates the limited heat affected zone of the plain carbon steel which is comprised of fine pearlite with ferrite outlining the grain boundaries. This is the characteristic structure for plain carbon steel which has been heated into the plastic range and cooled in air. This figure clearly shows the sharp definition at the weld interface and illustrates the absence of an adverse heat effected zone in the grouser tip. This figure also evidences the lack of admixture or interdiffusion of the metals of the two sections at the weld interface. The weld joint provided with this welding procedure produces a very strong bond between the grouser tip section and base section which is a result of intimate contact while the two metals are plastic but not molten. Under these conditions, the metals upon cooling are held together by interatomic forces resulting from recrystallization across the interface which results in the two metals being bonded together as strongly as are their individual grains.

Previous attempts to weld austenitic manganese steel to a plain carbon steel base by fusion have been unsuccessful as illustrated by the photomicrographs of FIGS. 11 through 11D which show an austenitic manganese steel grouser bar arc fusion welded by employing an austenitic stainless steel filler material (18% chrome, 8% nickel) as a bond. This filler material is compatible to both materials attempted to be welded. As noted previously, without such a filler material, even unsatisfactory welds such as the one shown are not obtainable. FIG. 11 (3×) clearly illustrates the unstable joint produced by such a weld which results from initially heating the austenitic grouser and the plain carbon base above their melting points and allowing the same to solidify subsequently.

As shown in FIGS. 11A and 11D (100×) the structures of the heat unaffected grouser tip section and the plain carbon grouser base section correspond to the structure shown in previously discussed FIGS. 10A and 10C. FIG. 11B (100×), however, shows the fusion zone between the austenitic manganese steel grouser and the weld filler material. The dark zone across the center of this figure illustrates the interdiffusion of the two materials and illustrates the coarsening of the grain structure in the grouser tip material adjacent to the fusion zone.

FIG. 11C (100×) shows the fusion zone between the weld filler material and the plain carbon base material and illustrates the zone of interdiffusion and admixture therebetween which is very susceptible to cracking. The solidifying of the formerly molten material results in a much coarser grain structure in the heat affected zone of the base metal which is less desirable from a strength standpoint than the finely grained structure which is generally maintained with the present invention as shown in FIG. 10B.

The above described welding procedure also may be employed with other alloy steels such as low alloy SAE 8630 or a modification thereof, SAE 86B30. SAE 8630 has the following composition: carbon .28–.33%; manganese .70–.90%; nickel .40–.70%; chromium .40–.60%; molybdenum .5–.25%. Modified 86B30 has the same composition as above noted with the addition of a minimum of .0005% boron.

Steels of this latter type are well suited for track shoe grousers because they have a good wear resistance to abrasion which makes them highly desirable in forming composite track shoes for use in sandy terrain. The welding procedure for forming a track shoe of this type is essentially the same as that described previously. However, if desired a heat treating operation-following welding is feasible, if found necessary, because the characteristics of the low alloy grouser tip and the plain carbon base plate are not as pronouncedly dissimilar as is true of austenitic manganese steel and plain carbon steel. A subsequent heat treatment would result in the elimination of the narrow heat effected zone which may result in the base material.

While several specific low alloy and high alloy steels have been disclosed herein as suitably being adaptable for employment in the process described, it should be understood that other equivalent materials also may be advantageously employed and such equivalent materials are contemplated as falling within the scope of this invention as evidenced by the appended claims.

We claim:

1. A method of forming a composite track shoe for the track of a crawler type vehicle, including the steps of providing a preformed track shoe plate comprised of a machinable plain carbon steel, providing a preformed grouser bar comprised of a wear resistant austenitic manganese steel, maintaining a section of said bar at a predetermined distance from and out of contact with respect to a predetermined section of said plate, passing electrical current through said bar and plate to establish an electrical arc therebetween to melt first portions of said bar and plate which are separated by said predetermined distance and to plasticize second portions of said bar and plate which are adjacent to said first portions thereof, pressing said bar and plate together under substantial pressure to force said melted first portions from therebetween and to weld said plasticized second portions of said bar and plate together in a solid state bond having a well defined interface which is substantially free of interdiffusion and admixture between the respective steels of said bar and plate.

2. A method of forming a composite article comprising providing an aritcle base section comprised of a plain carbon steel, providing an article tip section comprised of an alloy steel, separating said sections at a predetermined distance from each other, causing an electrical current within the range of from 5 to 8 volts and from 5,000 to 20,000 amps per square inch to arc between said sections, relatively moving said sections toward each other to sustain said arc for a period of from 10 to 60 seconds to melt first portions of said base and top sections and to plasticize second portions thereof which are closely adjacent to said first portions, maintaining the remainder of said base and tip sections substantially free of the effects of the heat produced by said arc, and forcing said sections together under a pressure of from 25,000 to 80,000 pounds per square inch to expel the melted first portions from between said sections and to bond the plasticized second portions of said base and tip sections of said article together in a solid state bond which is generally free of interdiffusion and admixture between the steels of the respective sections, and removing the expelled material from said article to finish the same.

3. A method of forming a composite track shoe for the track of a crawler type vehicle which comprises a machinable track shoe base plate of plain carbon steel and a wear resistant grouser bar of austenitic manganese steel bonded to said base plate, comprising clamping said base plate and grouser bar in jaws movable relative to each other, maintaining said plate and bar out of contact at a predetermined distance, initiating an electrical arc between said plate and bar over said predetermined distance by passing an electrical current of approximately 12,000 amps per square inch and a voltage of approximately 6 volts through said bar and plate, relatively moving said plate and bar towards each other to maintain said current and voltage for approximately 15 seconds to heat adjacent first portions of said bar and plate to melt the same and to plasticize second portions thereof which are adjacent to said first portions, maintaining the remainder of said bar and plate generally free of the heating effects of said arc whereby the structure of the remainder of said bar and plate is retained substantially unchanged, cutting of said current and voltage, and urging said adjacent portions into contact with each other by moving said jaws toward each other under a pressure of approximately 40,000 pounds per square inch to expel the melted first portions from between said bar and plate and to intimately weld the second portions thereof together in a solid state bond along a well defined interface which is substantially free of interdiffusion and admixture between the steels of said bar and plate and which is substantially free of the heating effects of said arc, and removing the expelled material after the same has hardened from said track shoe to finish the same.

4. The method of claim 3 which includes heating said plate and bar in a neutral controlled atmosphere.

References Cited in the file of this patent
UNITED STATES PATENTS

| | | |
|---|---|---|
| 651,597 | Eyre | June 2, 1900 |
| 1,020,158 | Powers | Mar. 12, 1912 |
| 1,302,413 | Murray | Apr. 19, 1919 |
| 1,342,957 | Gravell | June 8, 1920 |